BRADLEY & UPSON.
WHIFFLETREE TRACE HOOK.
No. 105,899.  Patented Aug. 2, 1870.
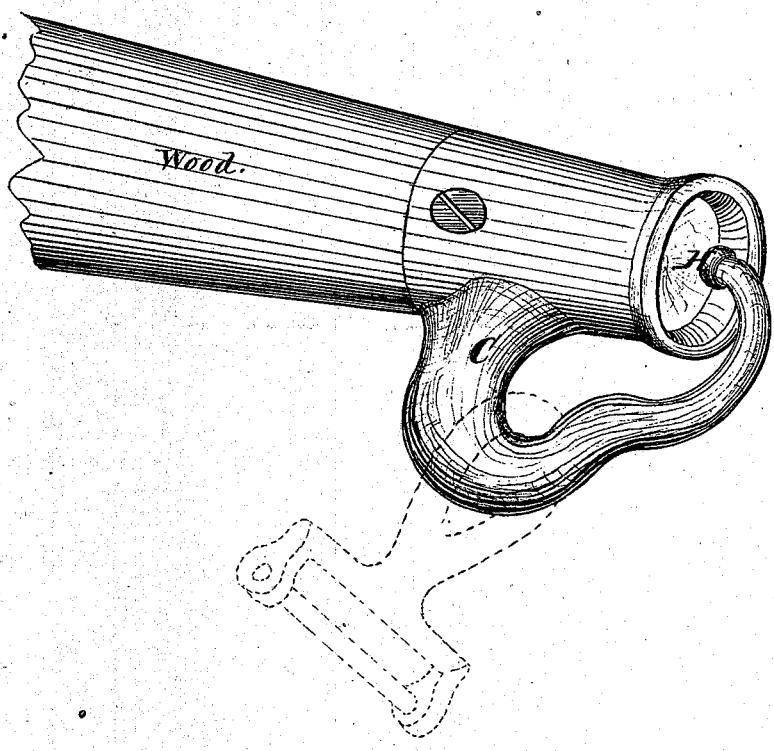
Witnesses:
Jesse B. Upson.
R. H. Bradley.
Inventor:
Chs. C. Bradley.
B. F. Upson.

United States Patent Office.

CHARLES COLLINS BRADLEY, OF BRODHEAD, WISCONSIN, AND BENJAMIN F. UPSON, OF ROCKFORD, ILLINOIS.

*Letters Patent No. 105,899, dated August 2, 1870.*

IMPROVEMENT IN WHIFFLETREE TRACE-HOOK.

The Schedule referred to in these Letters Patent and making part of the same

*To all whom it may concern:*

Be it known that we, CHARLES COLLINS BRADLEY, of Brodhead, in the State of Wisconsin, and BENJAMIN F. UPSON, of Rockford, in the State of Illinois, have invented a new and improved "Whiffletree-Trace-Hook;" and hereby declare the following to be a full description thereof, reference being had to the accompanying drawing and letters thereon.

To enable others to make and use our invention, we here describe its construction and operation.

We make our hooks of malleable iron, or other metal, somewhat in the common forms, cast in one piece, as shown in the drawing, Figure 1, there being a ferrule, about two inches in length, with the hook proper branching off from the side, as seen at c in the drawing, and then turned toward the outer end, and again curved around back, and the point of the hook H looking into the outer open end of the ferrule, and left so near thereto, or so much within the recess or open end, as to admit the end of a "cock-eye," and allow it to pass the point H, and be brought forward to its place in front of ferrule.

We leave a cup or recess in the outer end of ferrule, by not allowing the wood of whiffletree to reach the extreme end of ferrule, so but that a "cock-eye" may pass between the end of wood and end of hook H.

When in use, if traces slacken so that the cock-eyes pass from their places outward or upward or backward, they must come broadside to the end of ferrule, but will not be likely to slip out, as the point of the hook will not allow it to pass, unless the end of the cock-eye is thrust directly into the end of ferrule, to connect or disconnect therewith.

What we claim as our invention, and desire to secure by Letters Patent, is—

The construction of a whiffletree trace-hook, in connection with a ferrule, with the point of said hook within or facing the open end or recess therein, as set forth, or substantially the same.

CHARLES COLLINS BRADLEY.
BENJAMIN F. UPSON.

Witnesses:
JESSE B. UPSON,
REUBEN BRADLEY.